United States Patent [19]

Offerson

[11] Patent Number: 5,509,672

[45] Date of Patent: Apr. 23, 1996

[54] PAINTER'S SUPPLY CART

[76] Inventor: Leo A. Offerson, P.O. Box 302, Pedersen Road, Dawson Creek, B.C., Canada, U1G-4G7

[21] Appl. No.: 432,462

[22] Filed: May 1, 1995

[51] Int. Cl.⁶ .................................. B62B 3/00; B62B 5/04
[52] U.S. Cl. .......................... 280/47.35; 280/79.2
[58] Field of Search ........................... 280/47.34–47.35, 280/79.2, 79.3; 169/42, 65, 62, 49, 50; 188/5; 312/228.1

[56] References Cited

U.S. PATENT DOCUMENTS

| | | | |
|---|---|---|---|
| 2,313,350 | 3/1943 | Lebus | 169/49 |
| 2,525,208 | 10/1950 | Clink | 280/47.35 |
| 2,856,253 | 10/1958 | Flynn | 280/47.35 |
| 3,271,044 | 9/1966 | Bosko et al. | 280/47.35 |
| 3,874,531 | 4/1975 | Mayo | 280/47.35 |
| 4,020,959 | 5/1977 | Livesay | 280/47.35 |
| 4,250,967 | 2/1981 | Horwinski et al. | 169/49 |
| 4,652,062 | 3/1987 | Greenwood | 280/47.35 |
| 5,002,293 | 3/1991 | Gottselig | 280/47.35 |
| 5,069,464 | 12/1991 | Braconnier | 280/57.35 |
| 5,190,303 | 3/1993 | Schumacher et al. | 280/47.35 |
| 5,290,058 | 3/1994 | Adams et al. | 280/47.34 |

*Primary Examiner*—Brian L. Johnson

[57] ABSTRACT

A painters supply cart comprised of a cart having a sink formed therein. The sink has a fuseable link heat door hingedly secured to an edge thereof. The cart has four caster wheels disposed on corners thereof. The cart has a first compartment and a second compartment. The first compartment has a plurality of shelves disposed therein. The second compartment has a removable container-disposed therein positioned beneath the sink. The cart has a pair of doors hingedly secured on opposing edges thereof. An upper support board is secured to the cart and extends upwardly above the cart. The upper support board has a front surface and a rear surface. The front surface has a plurality of securement hooks secured thereto. The front surface has a paper towel holder secured thereon. A brake mechanism is secured to a bottom end of the cart.

3 Claims, 3 Drawing Sheets

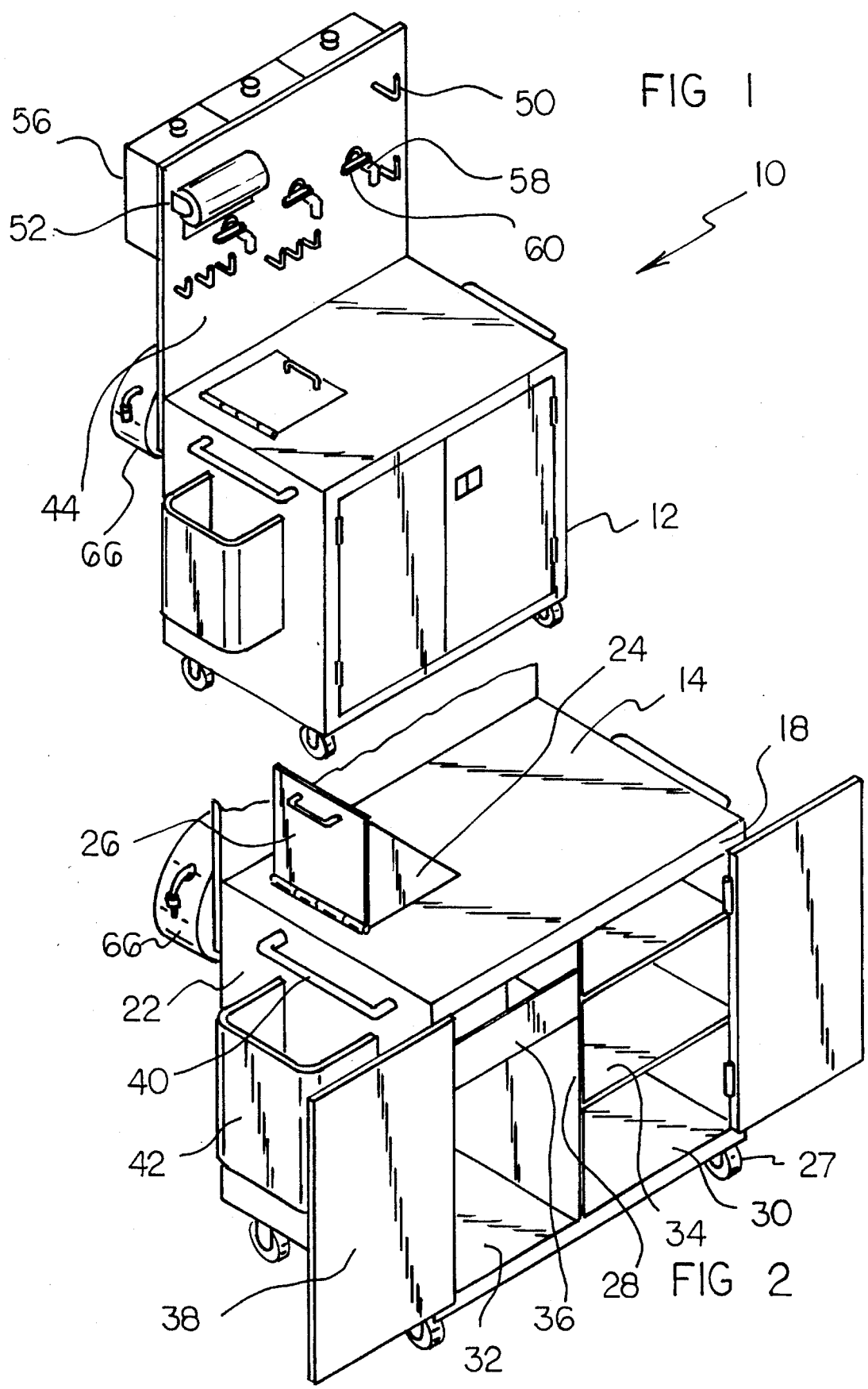

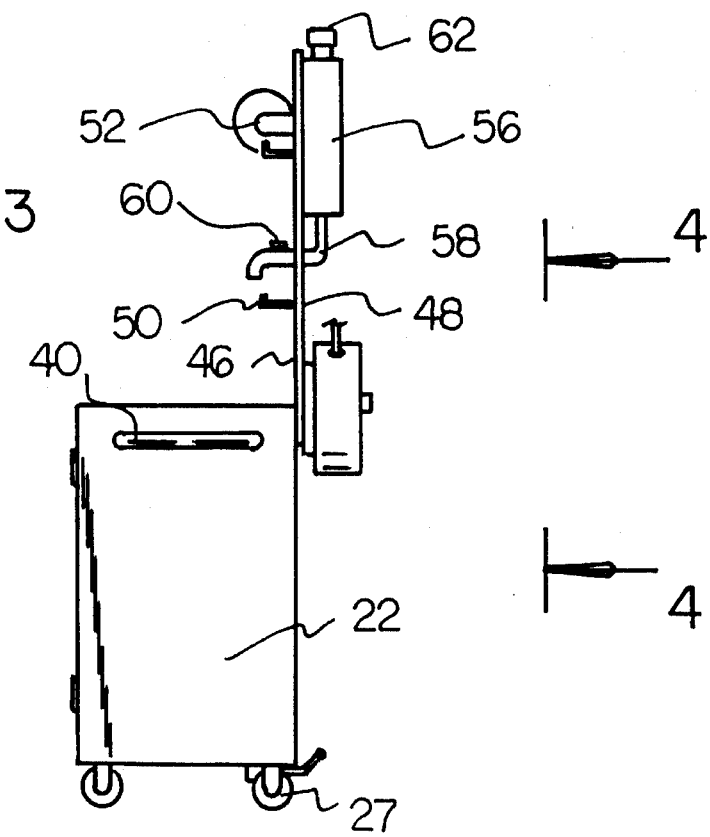
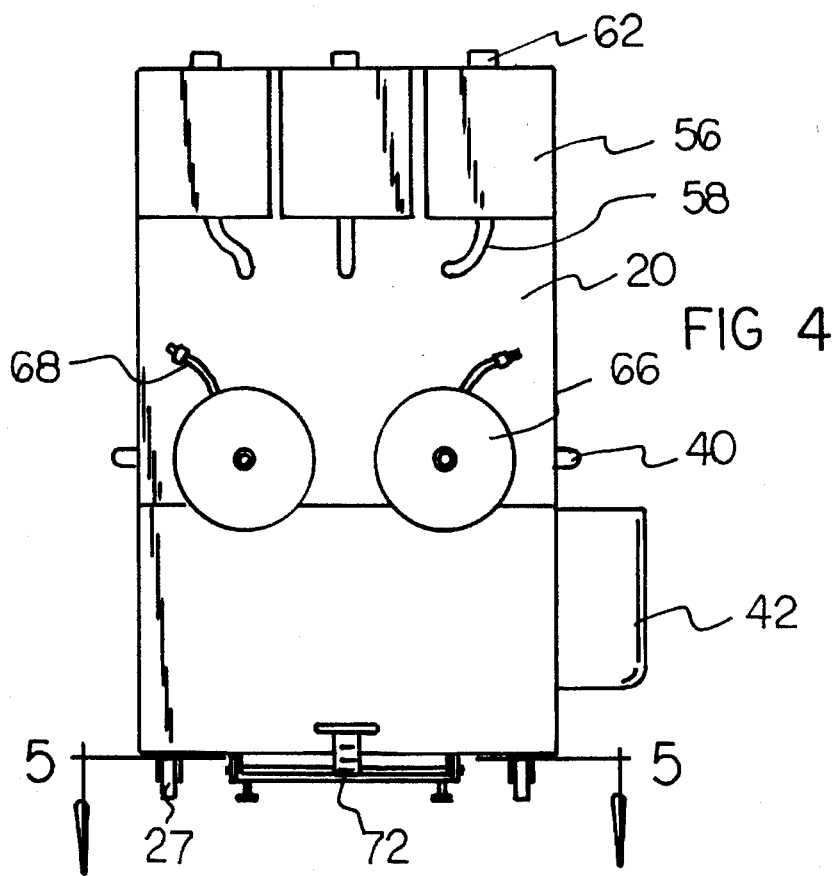

FIG 5
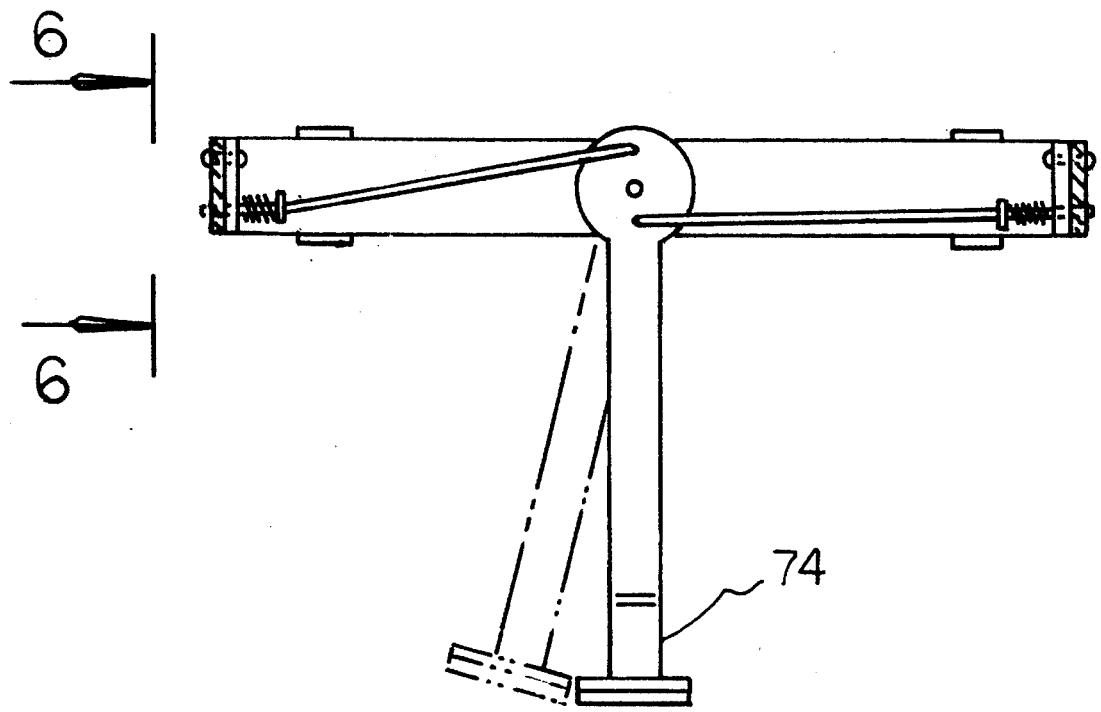
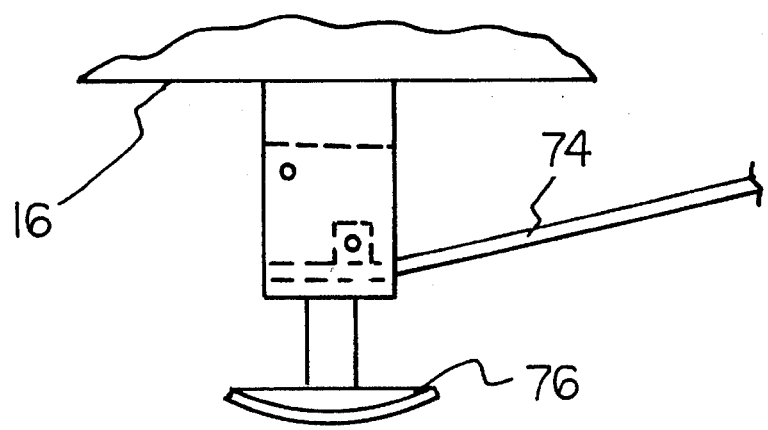
FIG 6

PAINTER'S SUPPLY CART

BACKGROUND OF THE INVENTION

1. Field of the Invention

The present invention relates to a painters supply cart and more particularly pertains to keeping all necessary materials for completing a paint job with a painters supply cart.

2. Description of the Prior Art

The use of painting carts is known in the prior art. More specifically, painting carts heretofore devised and utilized for the purpose of containing painting supplies are known to consist basically of familiar, expected and obvious structural configurations, notwithstanding the myriad of designs encompassed by the crowded prior art which have been developed for the fulfillment of countless objectives and requirements.

By way of example, U.S. Pat. No. 5,286,045 to Cyphers et al. discloses a paint container retainer for portable; painting equipment.

U.S. Pat. No. 5,002,293 to Gottselig discloses a painter's service cart.

U.S. Pat. No. 4,880,248 to Elmer discloses a manually propelled automotive painting tool cart.

U.S. Pat. No. 4,559,968 to Ryder et al. discloses a collapsible painting cart.

U.S. Pat. No. 3,752,494 to Dunn discloses a paint cart assembly and method of fabrication.

U.S. Pat. No. Des. 302,618 to Gottselig discloses the ornamental design for a painter's service cart.

While these devices fulfill their respective, particular objective and requirements, the aforementioned patents do not describe a painters supply cart for keeping all necessary materials for completing a paint job.

In this respect, the painters supply cart according to the present invention substantially departs from the conventional concepts and designs of the prior art, and in doing so provides an apparatus primarily developed for the purpose of keeping all necessary materials for completing a paint job.

Therefore, it can be appreciated that there exists a continuing need for new and improved painters supply cart which can be used for keeping all necessary materials for completing a paint job. In this regard, the present invention substantially fulfills this need.

SUMMARY OF THE INVENTION

In the view of the foregoing disadvantages inherent in the known types of painting carts now present in the prior art, the present invention provides an improved painters supply cart. As such, the general purpose of the present invention, which will be described subsequently in greater detail, is to provide a new and improved painters supply cart and method which has all the advantages of the prior art and none of the disadvantages.

To attain this, the present invention essentially comprises a cart having a top end, a bottom end, an open front end, a back end, and two side walls. The top end has a sink formed therein. The sink has a fuseable link heat door hingedly secured to an edge thereof. The bottom end has four caster wheels disposed on corners thereof. The open front end has a dividing wall therein separating the open front wall into a first compartment and a second compartment. The first compartment has a plurality of shelves disposed therein. The second compartment has a removable container disposed therein positioned beneath the sink. The open front end has a pair of doors hingedly secured on opposing edges thereof. Each of the two side walls has a handle secured thereto. One of the two side walls has a U-shaped receptacle secured thereto. The device contains an upper support board secured to an upper portion of the back end of the cart and extending upwardly of the top end of the cart. The upper support board has a front surface and a rear surface. The front surface has a plurality of securement hooks secured thereto. The front surface has a paper towel holder secured thereon. The device contains a plurality of solvent tanks secured to the rear surface of the upper support board. Each of the solvent tanks has a drainage valve extending through the front surface of the upper support board. Each drainage valve has a flow regulator coupled therewith. The device contains a pair of reels secured to the rear surface of the upper support board downwardly of the plurality of solvent tanks. Each of the reels has a 150 PSI regulator therein and a length of hose. The device contains a brake mechanism secured to the bottom end of the cart. The brake mechanism has a lever extending outwardly of the bottom end of the cart. The lever couples with a floor engaging portion to optionally engage the floor engaging portion or disengage the floor engaging portion.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved painters supply cart which has all the advantages of the prior art painting carts and none of the disadvantages.

It is another object of the present invention to provide a new and improved painters supply cart which may be easily and efficiently manufactured and marketed.

It is a further object of the present invention to provide a new and improved painters supply cart which is of durable and reliable construction.

An even further object of the present invention is to provide a new and improved painters supply cart which is susceptible of a low cost of manufacture with regard to both materials and labor, and which accordingly is then susceptible of low prices of sale to the consuming public, thereby making such a painters supply cart economically available to the buying public.

Still yet another object of the present invention is to provide a new and improved painters supply cart which provides in the apparatuses and methods of the prior art some of the advantages thereof, while simultaneously overcoming some of the disadvantages normally associated therewith.

Even still another object of the present invention is to provide a new and improved painters supply cart for keeping all necessary materials for completing a paint job.

Lastly, it is an object of the present invention to provide a new and improved painters supply cart comprised of a cart having a sink formed therein. The sink has a fuseable link heat door hingedly secured to an edge thereof. The cart has four caster wheels disposed on corners thereof. The cart has a first compartment and a second compartment. The first compartment has a plurality of shelves disposed therein. The second compartment has a removable container disposed therein positioned beneath the sink. The cart has a pair of doors hingedly secured on opposing edges thereof. An upper support board is secured to the cart and extends upwardly above the cart. The upper support board has a front surface and a rear surface. The front surface has a plurality of securement hooks secured thereto. The front surface has a paper towel holder secured thereon. A brake mechanism is secured to a bottom end of the cart.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of the preferred embodiment of the painters supply cart constructed in accordance with the principles of the present invention.

FIG. 2 is a partial perspective view of the present invention.

FIG. 3 is a side elevation view of the present invention.

FIG. 4 is a cross-sectional view as taken along line 4—4 of FIG. 3.

FIG. 5 is a cross-sectional view as taken along line 5—5 of FIG. 4.

FIG. 6 is a cross-sectional view as taken along line 6—6 of FIG. 5.

The same reference numerals refer to the same parts through the various Figures.

DESCRIPTION OF THE PREFERRED EMBODIMENT

With reference now to the drawings, and in particular, to FIGS. 1–6 thereof, the preferred embodiment of the new and improved painters supply cart embodying the principles and concepts of the present invention and generally designated by the reference number 10 will be described.

Specifically, it will be noted in the various Figures that the device relates to a new and improved painters supply cart for keeping all necessary materials for completing a paint job. In its broadest context, the device consists of a cart, an upper support board, a plurality of solvent tanks, a pair of reels, and a brake mechanism.

The device 10 contains a cart 12 having a top end 14, a bottom end 16, an open front end 18, a back end 20, and two side walls 22. The cart 12 is generally rectangular in configuration. The cart 12 is preferably constructed of steel, but could be constructed in other materials to minimize costs of the device 10. The top end 14 has a sink 24 formed therein. The sink 24 is comprised of stainless steel and takes up about ¼ of the surface space of the top end 14. The sink 24 has a drainage hole formed therein. The sink 24 has a fuseable link heat door 26 hingedly secured to an edge thereof. The door 26 is spring-loaded and will automatically close in the event of a fire. The bottom end 16 has four caster wheels 27 disposed on corners thereof. The four caster wheels 27 allow the cart 12 to be easily maneuvered. The four caster wheels 27 are all swively secured to the bottom end 16 to allow for greater maneuverability. The open front end 18 has a dividing wall 28 therein separating the open front end 18 into a first compartment 30 and a second compartment 32. The first compartment 30 has a plurality of shelves 34 disposed therein. These shelves 34 could be made to be adjusted to allow for varying spacing sizes within the first compartment 30. The shelves 34 are used to hold small cans of paint, masking paper, sand paper, and other small miscellaneous items associated with painting. The second compartment 32 has a removable container 36 disposed therein positioned beneath the sink 24. The removable container 36 is positioned beneath the drainage hole within the sink 24 thus allowing the removable container 36 to receive liquids poured into the sink 24 to be easily removed and disposed. The open front end 18 has a pair of doors 38 hingedly secured on opposing edges thereof. The pair of doors 38 can be easily closed or open to deny or gain access to paint supplies stored within the first 30 and second compartments 32. Each of the two side walls 22 has a handle 40 secured thereto. The handles 40 allow the cart 12 to be easily pushed and maneuvered around. The handles 40 are preferably U-shaped and large enough for two hands of user to handle. One of the two side walls 22 has a U-shaped receptacle 42 secured thereto. The U-shaped receptacle 42 is positioned beneath the handle 40 on the side wall 22. The receptacle 42 is used for a user to dispose of their garbage.

The device 10 contains an upper support board 44 secured to an upper portion of the back end 20 of the cart 12 and extending upwardly of the top end 14 of the cart 12. The upper support board 44 is generally rectangular in configuration and has a size corresponding to the top end 14 of the cart 12. The upper support board 44 has a front surface 46 and a rear surface 48. The front surface 46 has a plurality of securement hooks 50 secured thereto. The plurality of securement hooks 50 are positioned at various points on the front surface 46 and are used to support paint rollers, spray guns, and miscellaneous paint brushes. The front surface 46 has a paper towel holder 52 secured thereon.

The device 10 contains a plurality of solvent tanks 56 secured to the rear surface 48 of the upper support board 44. The preferred number of solvent tanks 56 is three, but could be more or less depending on needs of the user. The device 10 could be constructed without the solvent tanks 56. Each of the solvent tanks 56 has a drainage valve 58 extending through the front surface 46 of the upper support board 44. Each drainage valve 58 has a flow regulator 60 coupled therewith. The solvent tanks 56 are used to hold about two gallons of paint thinners, lacquer thinners, or enamel reducers or the like. By turning the flow regulator 60, a user can drain a chemical out of the drainage valve 58. Each of the plurality of solvent tanks 56 has an access hole with a removable cap 62 at an upper end thereof to allow the tanks 56 to be filled with the desired chemicals.

The device 10 contains a pair of reels 66 secured to the rear surface 48 of the upper support board 44 downwardly of the plurality of solvent tanks 56. Each of the reels 66 has a 150 PSI regulator therein and a length of hose 68. The pair of reels 66 are an optional accompaniment to the device 10. Each of the pair of reels 66 are adapted to hold at least twenty-five feet of hose. A user who has air available will not desire the pair of reels 66 to accompany the device 10.

The device 10 contains a brake mechanism 72 secured to the bottom end 16 of the cart 12. The brake mechanism 72 has a lever 74 extending outwardly of the bottom end 16 of the cart 12. The lever 74 couples with a floor engaging portion 76 to optionally engage the floor engaging portion 76 or disengage the floor engaging portion 76. The user simply steps on the lever 74 to lower the floor engaging portion 76 with the ground to prevent the cart 12 from rolling. By steeping back on the lever will release the floor engaging portion 76 and allow the cart 12 to be moved.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A painters supply cart for keeping materials for a paint job comprising, in combination:

a cart having a top end, a bottom end, an open front end, a back end, and two side walls, the top end having a sink formed therein, the sink having a fuseable link heat door hingedly secured to an edge thereof, the bottom end having four caster wheels disposed on corners thereof, the open front end having a dividing wall therein separating the open front end into a first compartment and a second compartment, the first compartment having a plurality of shelves disposed therein, the second compartment having a removable container disposed therein positioned beneath the sink, the open front end having a pair of doors hingedly secured on opposing edges thereof, each of the two side walls having a handle secured thereto, one of the two side walls having a U-shaped receptacle secured thereto;

an upper support board secured to an upper portion of the back end of the cart and extending upwardly of the top end of the cart, the upper support board having a front surface and a rear surface, the front surface having a plurality of securement hooks secured thereto, the front surface having a paper towel holder secured thereon;

a plurality of solvent tanks secured to the rear surface of the upper support board, each of the solvent tanks having a drainage valve extending through the front surface of the upper support board, each drainage valve having a flow regulator coupled therewith;

a pair of reels secured to the rear surface of the upper support board downwardly of the plurality of solvent tanks, each of the reels having a 150 PSI regulator therein and a length of hose;

a brake mechanism secured to the bottom end of the cart, the brake mechanism having a lever extending outwardly of the bottom end of the cart, the lever coupling with a floor engaging portion to optionally engage the floor engaging portion or disengage the floor engaging portion.

2. A painter's supply cart:

a cart having a sink formed therein, the sink having a fuseable link heat door hingedly secured to an edge thereof, the cart having four caster wheels disposed on corners thereof, the cart having a first compartment and a second compartment, the first compartment having a plurality of shelves disposed therein, the second compartment having a removable container disposed therein positioned beneath the sink, the cart having a pair of doors hingedly secured on opposing edges thereof;

an upper support board secured to the cart and extending upwardly above the cart, the upper support board having a front surface and a rear surface front surface having a plurality of securement hooks secured thereto, the front surface having a paper towel holder secured thereon;

a brake mechanism secured to a bottom end of the cart; and a plurality of solvent tanks secured to the rear surface of the upper support board, each of the solvent tanks having a drainage valve extending through the front surface of the upper support board, each drainage valve having a flow regulator coupled therewith.

3. The painter's supply cart as described in claim 2 and further including a pair of reels secured to the rear surface of the upper support board downwardly of the plurality of solvent tanks, each of the reels having a 150 PSI regulator therein and a length of hose.

* * * * *